United States Patent [19]

Agarwal et al.

[11] 4,338,229

[45] Jul. 6, 1982

[54] HOT MELT ADHESIVE COMPOSITIONS

[75] Inventors: Pawan K. Agarwal, Westfield, N.J.; Henry S. Makowski, deceased, late of Scotch Plains, N.J., by Patricia Helen Makowski, executrix

[73] Assignee: Exxon Research & Engineering Co., Florham Park, N.J.

[21] Appl. No.: 196,211

[22] Filed: Oct. 14, 1980

[51] Int. Cl.$^3$ .............................................. C08L 95/00
[52] U.S. Cl. ................................... 524/399; 524/499; 524/232; 524/322; 524/445; 525/195; 525/211; 524/451; 524/554
[58] Field of Search .................... 260/23.5 A, 23.7 M, 260/27 BB

[56] References Cited

U.S. PATENT DOCUMENTS

| | | | |
|---|---|---|---|
| 3,093,601 | 6/1963 | Gessler | 260/27 BB |
| 3,235,522 | 2/1966 | Carr | 260/27 BB |
| 3,882,065 | 5/1975 | Snow | 260/27 BB |
| 4,072,735 | 2/1978 | Ardemagni | 260/27 BB |
| 4,127,546 | 11/1978 | Lundberg | 260/27 BB |
| 4,153,588 | 5/1979 | Makowski | 260/23.5 A |
| 4,187,206 | 2/1980 | Brenner | 260/23.5 A |
| 4,208,310 | 6/1980 | Lundberg | 260/23.5 A |

*Primary Examiner*—Paul R. Michl
*Attorney, Agent, or Firm*—Richard E. Nanfeldt

[57] ABSTRACT

This invention relates to hot melt adhesive compositions which include a neutralized sulfonated elastomeric polymer, wherein the neutralized sulfonated elastomeric polymer has about 10 to about 100 meq. of neutralized sulfonate groups per 100 grams of the neutralized sulfonated elastomeric polymer, and about 25 to about 200 parts by weight of a hydrocarbon resin of a petroleum or coal tar distillate, aliphatic dienes and mono- and di-olefins, cyclic olefins of 5 to 6 carbon atoms and hydrogenated poly cyclics per 100 parts by weight of the neutralized sulfonated elastomeric polymer. The hot melt adhesive composition can further include an unsaturated hydrocarbon resin such as polyisoprene.

11 Claims, No Drawings

HOT MELT ADHESIVE COMPOSITIONS

BACKGROUND OF THE INVENTION

1. Field of the Invention

This invention relates to hot melt adhesive compositions which include a neutralized sulfonated elastomeric polymer, wherein the neutralized sulfonated elastomeric polymer has about 5 to about 100 meq. of neutralized sulfonate groups per 100 grams of the neutralized sulfonated elastomeric polymer, and about 25 to about 200 parts by weight of a hydrocarbon resin of a petroleum or coal tar distillate, aliphatic dienes and mono- and diolefins, cyclic olefins of 5 or 6 carbon atoms and hydrogenated poly cyclics per 100 parts by weight of the neutralized sulfonated elastomeric polymer.

Broadly speaking, synthetic adhesives used in packaging can be classified into four categories: water based, solvent based, reactive and hot melt adhesives. Of these four, currently the water based are used most extensively. Usually the water based adhesives are based on emulsion polymers and are applied to porous cellulosic substrates. Energy from the outside in some fashion is applied to the system to evaporate the water in order that a strong bond may be formed. Besides this energy requirement for the formation of the bond, there is another complication with the use of water based adhesive. For a uniform coating a good uniform wetting of the substrate surface is desired, which practically is not easily achieved.

With the non-solvent based adhesives usually a good wetting is achieved; however, their use has been becoming extremely restrictive due to expensive energy requirements for the evaporation of solvents and fire hazards associated with the use of organic solvents. The strict government environmental regulations and restrictions regarding worker exposure to solvent vapors, etc., put extra pressure on the packager to use non-solvent based adhesives.

Recently the use of hot melt adhesives is growing very rapidly in the packaging industry. Besides the elimination of a solvent there are a number of other reasons why hot melt adhesives are becoming popular in the packaging industry. The hot melt adhesives are generally applied (as the name applies) by conventional extrusion or coating techniques in the temperature range of 250° to 450° F. on one of the surfaces to be bonded. The other surface is brought in contact to the hot surface just for long enough time for the melt to cool. Upon solidification a strong and durable bond is formed. The whole operation takes only a few seconds, and the product is ready for shipment or other operation as the case may be. The speed and use of the operation makes these classes of adhesives the most attractive to the manufacturer.

The key requirements of resins suitable for hot melt adhesive applications are that they should have good physical properties, e.g., tensile strength, etc., at ambient conditions, and they can flow easily at fabrication temperatures.

The ethylene vinyl acetate (EVA) copolymers and styrene block copolymers, such as Kraton, have been extensively used as hot melt adhesives since they are the only materials which come close in meeting the above requirements to a reasonable extent. However, their use has been limited largely to pressure sensitive adhesives. Considerable research on the future of adhesives has shown that there will be a continuing demand for new resins with improved characteristics which will be suitable for applications such as laminated tapes, case sealings, cartons and various other similar applications which Kraton-type systems are unsuitable for.

There is a significant demand in the marketplace today for polymer systems which exhibit good green strength or tensile properties at ambient temperatures, and yet when heated to a predetermined temperature will give good flow such that they may be applied to a coating or substrate as a coating on a substrate by melt extrusion or other techniques. In the past it has been common to employ organic solution as a way of coating polymer systems designed to give good adhesive properties. This practice is now under considerable pressure, due to the fact that the organic solvents must be evaporated from the coating giving rise to pollution problems and excess energy requirements. Marked advances have been made in this area wherein block copolymers, such as Kraton, have been employed as basic adhesive components. These polymers have excellent properties at ambient temperatures, and yet when heated to elevated temperatures can be extruded or otherwise applied in bulk without the requirement of evaporating large amounts of solvent.

2. Prior Art

Several U.S. Patents have described sulfonated polymers such as sulfonated butyl and sulfonated EPDM in adhesive applications (e.g. U.S. Pat. Nos. 3,867,247 and 3,801,531). It is important to distinguish the instant invention over those prior art systems. The former patent is directed at a sulfonated butyl cement which is solvent based and is employed to laminate various substrates. It is important to note that the instant invention differs dramatically from that patent as follows:

(a) The adhesives of the instant invention are not deposited from solvents but are hot melt and require no solvents.

(b) The instant invention may optionally include a preferential plasticizer capable of associating with the metal sulfonate groups and thereby reducing the melt viscosity of the resulting blends to make the systems more processable.

(c) The instant invention may include an unsaturated or saturated hydrocarbon polymer to improve and/or control its mechanical and flow properties.

(d) The instant invention is directed at sulfonated polypentenamer resin, whereas most of the prior art deals with sulfonated Butyl rubber (e.g. U.S. Pat. No. 3,867,247).

SUMMARY OF THE INVENTION

This invention relates to hot melt adhesive compositions which include a neutralized sulfonated elastomeric polymer, wherein the neutralized sulfonated elastomer has about 5 to about 100 meq. of neutralized sulfonate groups per 100 grams of the neutralized sulfonated elastomeric polymer and about 25 to about 200 parts by weight of a hydrocarbon resin of a petroleum or coal tar distillate, having about 5 to about 6 carbon atoms, said hydrocarbon resin having aliphatic dienes and mono-olefins therein per 100 parts by weight of the neutralized sulfonated elastomeric polymer and optionally, about 1 to about 50 parts of a preferential plasticizer per 100 parts of the neutralized sulfonated elastomeric polymer can be added to the composition.

GENERAL DESCRIPTION

The present invention relates to unique and novel hot melt adhesive compositions which comprise a blend of a neutralized sulfonated elastomeric polymer and a hydrocarbon resin, wherein the the compositions can be optionally added an ionic preferential plasticizer or a filler thereby modifying the rheological and physical properties of the hot melt adhesive compositions.

The neutralized sulfonated elastomeric polymers of this present instant invention are derived from unsaturated elastomeric polymers having the formula

wherein n=2, 3, 4, 5 or 6, wherein n=2 is preferred. The preferred elastomeric polymer is polypentenamer which is generally sulfonated by the process described in U.S. Pat. No. 3,476,728 which is herein incorporated by reference. The elastomeric polymers of the instant invention have $\overline{M}n$ as measured by GPC of about 10,000 to about 700,000, more preferably about 50,000 to about 300,000, and most preferably about 70,000 to about 150,000. The Mooney viscosity (M.L. 1+8, 212° F.) of the unsaturated elastomeric polymers are about 20 to about 80, more preferably about 30 to about 70, and more preferably about 40 to about 60. The unsaturated elastomeric polymers generally contain about 0 to about 100% trans double bond configuration, more preferably about 5 to about 90, and most preferably about 10 to about 80; about 0 to about 50% as cis double bond configuration, more preferably about 0 to about 4 and most preferably about 0 to about 20; and less than about 10% vinyl side groups, more preferably less than about 5%. A typical polypentenamer (code #?) which is manufactured by Goodyear Tire and Rubber Company, has an $M_n$ as measured by GPC of 94,000 and Mw as measured by GPC of 172,000 and about 82% trans double bonds, about 17% as cis double bonds and about 1% vinyl side groups.

The sulfonated elastomeric polymers such as polypentenamers and their hydrogenated derivatives can be prepared by the following synthetic route:

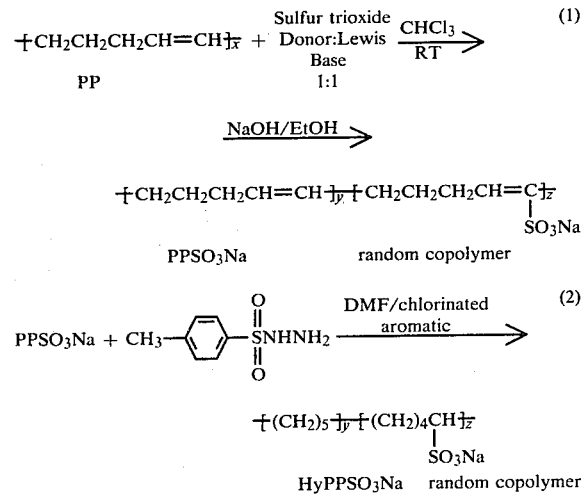

The sulfonated elastomeric polymers such as polypentenamer are formed by dissolving the elastomeric polymer in a non-reactive solvent such as a chlorinated aliphatic solvent, chlorinated aromatic hydrocarbon, an aromatic hydrocarbon, or an aliphatic hydrocarbon such as chloroform carbon tetrachloride, dichloroethane, chlorobenzene, benzene, toluene, xylene, cyclohexane, pentane, isopentane, hexane, isohexane or heptane. The preferred solvents are the lower boiling chlorinated aliphatic hydrocarbons. A sulfonating agent is added to the solution of the elastomeric polymer and non-reactive solvent at a temperature of about −100° C. to about 100° C. for a period of time of about 1 to about 60 minutes, most preferably at room temperature for about 5 to about 45 minutes; and most preferably about 15 to about 30. Typical sulfonating agents are described in U.S. Pat. No. 3,642,728 incorporated herein by reference. These sulfonating agents are a complex of a sulfur trioxide donor and a Lewis base containing oxygen, sulfur, or phosphorous. Typical sulfur trioxide donors are $SO_3$, chlorosulfonic acid, fluorosulfonic acid, sulfuric acid, oleum etc. Typical Lewis bases are: dioxane, tetrahydrofuran, tetrahydrothiophene or triethyl phosphate. The most preferred sulfonation agent for this invention a complex of freshly distilled sulfur trioxide with triethyl phosphate which is pregenerated in chloroform before its addition to the reaction medium in a chlorinated aliphatic or aromatic hydrocarbon.

It should be pointed out that neither the exact sulfonating agent nor the manner of sulfonation is critical, provided that the sulfonating method does not degrade the polymer backbone. The reaction is quenched with an aliphatic alcohol such as methanol, ethanol or isopropanol, with an aromatic hydroxyl compound, such as phenol, a cycloaliphatic alcohol such as cyclohexanol or with water. The sulfonated elastomeric polymer has about 10 to about 100 meq. sulfonate groups per 100 grams of the unneutralized sulfonated elastomeric polymer, more preferably about 15 to about 50; and most preferably about 20 to about 40. The meq. of sulfonate groups per 100 grams of polymer is determined by both titration of the polymeric sulfonate and Dietert Sulfur analysis. In the titration of the sulfonated polymer, the polymer is dissolved in solvent consisting of 95 parts of toluene and 5 parts of methanol at a concentration level of 50 grams per liter of solvent. The sulfonated polymer is titrated with ethanolic sodium hydroxide to an Alizarin-Thymolphthalein end-point.

The sulfonated polymer is gel free and hydrolytically stable. Gel is measured by stirring a given weight of polymer in a solvent comprised of 95 toluene-5-methanol at a concentration of 5 wt. %, for 24 hours, allowing the mixture to settle, withdrawing a weighed sample of the supernatant solution and evaporating to dryness. Hydrolytically stable means that the acid function, in this case the unneutralized sulfonate groups, will not be eliminated under neutral or slightly basic conditions to a neutral moiety which is incapable of being converted to highly ionic functionality.

Neutralization of the sulfonated elastomeric polymer is done by the addition of a solution of a basic salt to the unneutralized sulfonated elastomeric polymer dissolved in the mixture of the aliphatic alcohol and nonreactive solvent. The basic salt is dissolved in a binary solvent system consisting of water and/or aliphatic alcohol. The counterion of the basic salt is selected from a carboxylic acid having from about 1 to about 4 carbon atoms, a hydroxide, or alkoxide, and mixtures thereof. The preferred neutralizing agent is a metal hydroxide or a metal acetate, more preferably sodium hydroxide or zinc acetate. Sufficient metal salt of the carboxylic acid is added to the solution of the acid form of the elastomeric polymer to effect neutralization. It is preferable to neutralize at least 95% of the unneutralized sulfonate groups, more preferably about 98%, most preferably 100%. Examples of metal oxides useful in preparing metal sulfonates are MgO, CaO, BaO, ZnO, Ag$_2$O, PbO$_2$ and Pb$_3$O$_4$. Useful examples of metal hydroxides are NaOH, KOH, LiOH, Mg(OH)$_2$ and Ba(OH)$_2$. Alternatively, the unneutralized sulfonated groups of the unneutralized sulfonated elastomeric polymer can be neutralized with an organic amine such as described in U.S. Pat. No. 3,642,728.

The neutralized sulfonated unsaturated elastomeric polymer is hydrogenated by dissolving the neutralized sulfonated unsaturated elastomeric polymer in a mixed solvent system of dimethyl formamide and either chlorobenzene or 1,2,4-trichlorobenzene and the hydrogenation was conducted by the addition of purified p-toluenesulfonyl hydroxide at a temperature of 80° C. under a N$_2$ atmosphere. The hydrogenation reaction was carried out by heating to 130°–135° C. and maintaining at this temperature for 2 hours. The hydrogenation product is collected by pouring the reaction mixture on acetone, filtering washing with ethanol and water and then drying under vacuum and heat. The hydrogenation step can be repeated to ensure complete hydrogenation.

The metal sulfonate containing elastomeric polymers at higher sulfonate levels can possess extremely high melt viscosities and are thereby difficult to process. The optional addition of ionic group plasticizers markedly reduces melt viscosity and frequently enhances physical properties. To the neutralized sulfonated elastomeric polymer is added, in either solution (the sulfonated polymer is redissolved) or to the neutralized sulfonated elastomeric polymer in bulk, a preferential plasticizer selected from the group consisting of carboxylic acids having about 5 to about 30 carbon atoms, more preferably about 8 to about 22 carbon atoms, or basic salts of these carboxylic acids, wherein the metal ion of the basic salt is selected from the group consisting of aluminum, ammonium, lead and Groups I-A, II-A, I-B and II-B of the Periodic Table of Elements and mixtures thereof. The carboxylic acids are selected from the group consisting of lauric, myristic, palmitic or stearic acids and mixtures thereof; e.g. zinc stearate, magnesium stearate, or zinc laurate.

The preferential plasticizer is incorporated into the neutralized sulfonated elastomeric polymer at about 3 to about 75 parts by weight based on 100 parts by weight of the neutralized sulfonated polymer more preferably at about 7 to about 50, and most preferably at about 10 to about 30. The metallic salt of the carboxylic acid can also be used as neutralizing agent. In the case of neutralizing agent and plasticizer being the identical chemical species, additional metallic salt is added over the required levels of neutralization. Alternatively, other preferential plasticizers are selected from amines, amides such as stearamide, ammonium and amine salts of carboxylic acids and mixtures thereof. The preferred plasticizers are selected from carboxylic acids having about 8 to about 22 carbon atoms or metallic salts of fatty acid and mixtures thereof.

Commercial Tackifier Resins

To the hot melt adhesive composition is added a commercial tackifying resin having a softening point of about 0° to about 160° C., more preferably about 50 to about 140° C. and most preferably about 70° to 120° C. A variety of commercial tackifier resins are available. Some of these resins contain α and/or β pirene base polyterpene resins as the main ingredient while others are derived from the polymerization of petroleum or coal distillates which consist of aliphatic dienes, mono and diolefins and cyclic olefins having about 5 to about 6 carbon atoms. The latter type of tackifiers have primarily piperlene and/or isoprene structure. A general but excellent description of tackifying resins derived from petroleum derivatives can be found in, for example, *Encyclopedia of Polymer Science and Technology*, Vol. 9, Pages 853 to 860, chapter by John Findlay, Published by John Wiley & Sons, NY(1968).

Typical but non-limiting tradenames of these commercial tackifiers are Wingtak of Goodyear, Escorez of Exxon, Piccolyte of Hercules and Zonrez of Arizona Chemicals. Recently these and various other companies have also started marketing relatively higher softening point resins. These are generally modified aliphatic hydrocarbon resins and/or hydrogenated polycyclics. The physical appearance of these commercial tackifying resins varies, depending upon their softening point, they can be either viscous liquids or light-colored solids at room temperature. Most often their initial color (Gardner) is about 3.0 to about 7.0 and the density from about 0.7 to 1.0 gm/cm$^3$ at room temperature. The acid number of these resins is usually less than 1. In general, the molecular weight of these commercial tackifying resins is not homogeneous, it spreads the number average molecular weight $\overline{M}n$ can be from about 300 to about 5000 and more preferably about 500 to about 2000 and most preferably about 700 to 1600.

As well-known to those familiar with the use of tackifying resins, because of their wide range compatability, any of them can be used with sulfonated polymers in proper formulation, which will yield adhesive systems of varying physical characteristics. To cite an example in the present invention, the tackifying resins used are those based on hydrocarbon resins.

These hydrocarbon tackifier resins are incorporated into the hot melt adhesive composition at about 25 to about 700 parts by weight per 100 parts by weight of the neutralized sulfonated elastomeric polymer, more preferably about 50 to about 500, and most preferably about 75 to about 300.

Method of Forming Blend Adhesive Composition

The blend compositions of the neutralized sulfonated elastomeric polymer with or without preferential plasticizer and the hydrocarbon tackifier resin can be formed by techniques well-known in the art. For example, the blend composition of the hot melt adhesive can be compounded on a hot two-roll mill. Other methods known in the art which are suitable for making these compositions include those methods employed in the plastic and elastomer industries for mixing polymer systems. An excellent polymer blend composition of this invention can be obtained through the use of a high shear batch intensive mixer called the Banbury. Alternatively, economic advantages in terms of time and labor savings can be obtained through the use of a Farrel Continuous Mixer, a twin screw extruder, or tandem extrusion techniques which are continuous mixing types of equipment. The Banbury mixing device is the preferred batch type mixer, and the twin screw extruder is the preferred continuous mixer.

Extended Blend Adhesive Composition

To the blend compositions of the hot melt adhesive compositions can be added fillers which are selected from the group consisting of talcs, ground calcium carbonate, water precipitated calcium carbonate, delaminated, calcined or hydrated clays, silicas, and carbon blacks, and mixtures thereof. These fillers are incorporated into the blend composition at about 5 to about 800 parts by weight per 100 parts by weight of the neutralized sulfonated elastomeric polymer, more preferably at about 50 to about 500; and most preferably at about 75 to about 300. Typically, these fillers have a particle size of about 0.03 to about 20 microns, more preferably about 0.3 to about 10, and most preferably about 0.5 to about 10. The oil absorption as measured by grams of oil absorbed by 100 grams of filler is about 10 to about 100, more preferably about 10 to about 85 and most preferably about 10 to about 75. Typical fillers employed in this invention are illustrated in Table I.

Oil Extended Adhesive Compositions

It is oberved that the blend composition of the instant invention can also include oils to further improve low temperature properties and tack characteristics of the resulting adhesive levels of oil of less than about 100 parts by weight per 100 parts of the neutralized sulfonated elastomeric polymer can be incorporated, more preferably about 1 to about 90 parts. Oils are particularly useful when high levels of petroleum resin tackifiers are used since such materials can harden the resulting composition. Oils can further soften and reduce the cost. Typical oils that can be used may be low viscosity aromatic, naphthenic or paraffin petroleum oils. Typical oils are illustrated in Table II.

H. Method of Fabrication of Adhesive Compositions

Because of the significant advances in the packaging technology, the hot melt adhesive compositions can be used by conventional polymer fabricating techniques. After the blending is complete, the adhesive mass can either be extruded and/or calendered to a uniform thickness on top of the substrate which could be paper, cloth, aluminum foil or glass fabric. The temperature and the through put of the extrusion are variable depending upon the viscosity of the tackifying mass and the desired coating thickness. Typically the temperature of extrusions and rolls may be from about 200° to 400° F. The substrates or backings to which the pressure sensitive adhesive compositions are applied may be of various porous or nonporous types and they may be organic or inorganic in nature. Most generally, these materials are those which are customarily employed in pressure sensitive tapes, either the cloth or paper backed types or tape backings made of synthetic materials, for example, polyesters such as the copolymer of ethylene glycol with terephthalic acid, vinyls such as a copolymer of vinylidene chloride and vinyl chloride, or a copolymer of vinylidene chloride with acrylonitrile, cellophane, cellulose acetate, polyvinyl chloride, polyvinyl acetate, polypropylene, polyethylene, ethylene-propylene plastic copolymer. Sheetings and tapes of cloth or textiles of either natural or synthetic fiber origin, such as glass fiber cloth, wood, and finally sheets or strips of metals such as steel, copper, aluminum, and alloys thereof can also be employed. In general, the backings employed are those which have been heretofore been conventionally employed in preparing pressure sensitive labels, tapes, sheetings and the like and the selection of any particular substrate material is not a specific novel feature of the present invention.

Detailed Description of the Invention

The advantages of the hot melt adhesive compositions of the present invention can be more readily appreciated by reference to the following examples and tables. Unless otherwise specified, all measurements are in parts per hundred by weight.

EXAMPLE 1

Preparation of Sulfonated Polypentenamer via. in situ generation of the Sulfonating Complexing agent—fifty grams of the polypentenamer in four batches taken and each was dissolved in 1000 ml of hexane and/or chloroform. Various runs were simultaneously carried out. The dissolution of the polypentenamer was done both at room temperature and 50° C. After complete dissolution of the polymer appropriate amounts of acetic anhydride were added and the concentrated sulfuric acid was dripped in at the indicated temperatures see Table III. All the runs were agitated for sixty minutes. The sulfonation reaction was terminated with methanol. Antioxidant were added at this stage. The resulting cement was stream stripped. The polymer was washed in a Waring blender. The final drying of the polymer was done on a waring two roll mill at about 120° F. Table III lists the composition of the various ingredients used in the preparation of sulfonated polypentenamer. At the bottom of this Table analytical data regarding its sulfonate content etc. are shown.

TABLE I

| Filler | Code # | Oil Absorption grams of oil/100 grams of filler | Specific Gravity | Avg. Particle Size Micron | pH |
| --- | --- | --- | --- | --- | --- |
| Calcium Carbonate Ground | Atomite | 15 | 2.71 | | 9.3 |
| Calcium Carbonate Precipitated | Purecal U | 35 | 2.65 | .03–.04 | 9.3 |
| Delaminated Clay | Polyfil DL | 30 | 2.61 | 4.5 | 6.5–7.5 |
| Hydrated Clay | Suprex | | 2.6 | 2 | 4.0 |
| Calcined Clay | Icecap K | 50–55 | 2.63 | 1 | 5.0–6.0 |
| Magnesium Silicate | Mistron Vapor | 60–70 | 2.75 | 2 | 9.0–7.5 |

TABLE II

| Type Oil | Oil Code # | Viscosity ssu | Mn | % Polars | % Aromatic | % Saturates |
| --- | --- | --- | --- | --- | --- | --- |
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |

TABLE III

COMPOSITION AND PREPARATION OF SULFONATED POLYPENTENAMER

| Sample # | 1 | 2 | 3 | 4 |
|---|---|---|---|---|
| Polypentenamer (gm) | 50 | 50 | 50 | 50 |
| Hexane (ml) | 1000 | — | — | — |
| Chloroform (ml) | — | 1000 | 1000 | 1000 |
| Acetic Anhydride, (ml) | 3.83 | 3.83 | 3.83 | 7.66 |
| Conc. $H_2SO_4$, (ml) | 1.4 | 1.4 | 1.4 | 2.8 |
| Sulfonation Temperature, °C. | R.T | R.T | 50 | 50 |
| Methanol, (ml) | 75 | 75 | 75 | 75 |
| Antioxidant, 2246 (gm) | 0.25 | 0.25 | 0.25 | 0.25 |
| Analysis Data | | | | |
| Sulfonate Content, Acid Titration meq/100 gm. of polymer | 9.0 | 11.1 | 13.1 | 18.6 |
| Weight % Sulfur | 0.13 | 0.20 | 0.22 | 0.26 |
| MEQ. Sulfonate/100gm P.P. | 4.1 | 6.3 | 6.9 | 8.2 |
| Reagent Conversion, % | 8 | 13 | 14 | 16 |

EXAMPLE 2

Preparation of Sulfonated Polypentenamer Using the Prepared Sulfonating Complexing Agent Acetyl Sulfate In this series of experiments the sulfonating complex acetyl sulfate was generated outside the reaction vessel. Its preparation was as follows. In a 250 ml. 2-neck flask with stirring bar, 0.404 moles which is equal to 38.15 ml of acetic anhydride was charged. The flask was cooled to about −15° C. using the dry ice and isopropyl alcohol. Concentrated sulfuric acid of 0.25 moles (=14.0 ml) was dripped in. It was known that this reaction is exothermic, and the temperature of the reaction vessel can rise very rapidly to high temperatures. All the necessary precautions were taken to not allow the temperature of the vessel to exceed above 0° C. After the completion of the reaction the solution temperature was allowed to rise slowly to the room temperature. Appropriate aliquots of this sulfonating agent was used to sulfonate the polypentenamer polymer. The rest of the procedure is similar to that of Example 1. Table IV lists all the quantities of the ingredients used in this series. Appropriate quantities of the neutralizing agents could then be used to get the desired neutralized polymer.

TABLE IV

COMPOSITION AND PREPARATION OF SULFONATED POLYPENTENAMER USING EXTERNAL SULFONATING REAGENT

| Sample # | 1 | 2 | 3 | 4 |
|---|---|---|---|---|
| Polypentenamer (gm) | 50 | 50 | 50 | 50 |
| Chloroform (ml) | 1000 | 1000 | 1000 | 1000 |
| 4.84 molar Neat Acetyl Sulfate Volume, ml | 5.17 | 10.34 | 5.17 | 10.34 |
| M moles | 25 | 50 | 25 | 50 |
| M moles/100 gm P.P. | 50 | 100 | 50 | 100 |
| Sulfonation Temperature, °C. | R.T | R.T | 50 | 50 |
| Methanol, ml | 75 | 75 | 75 | 75 |
| Sulfonate Content, Acid Titration Meq/100 gm. P.P. | 10.92 | 10.46 | 9.45 | 11.1 |
| Weight % Sulfur | 0.13 | 0.25 | 0.20 | 0.33 |
| Meq. Sulfonate/100 gm P.P. | 4.1 | 7.8 | 6.3 | 10.4 |
| Reagent Conversion, % | 8 | 8 | 3 | 10 |

EXAMPLE 3

Various blends of the zinc neutralized sulfonated polypentenamer with commercial tackifier resins such as Wingtak Plus optionally incorporating saturated or unsaturated hydrocarbon polymers such as polyisoprene were made. Illustrative examples of these blends are shown in Table V. The blending of the various ingredients were done on a hot two-roll mill at about 150° C. for about 15 to 30 minutes until a homogeneous system was achieved. For comparative purposes a binary blend of Kraton 1107 with Wingtak plus tackifying resin is also included. This blend is designated as blend number 5-5. Tackifying resin Wingtak plus is a solid synthetic polyterpene resin marketed by Good Year Corporation with softening point of about 94° C., a specific gravity of 0.93 and a weight average molecular weight of 1100. Other tackifying resins such as Exxon's Escorez 1310 could be used as well, and will yield blend compositions of satisfactory adhesive characteristics. Information regarding the Kraton block polymer appears as a foot note at the bottom of Table V. Both quantitative and qualitative properties of the blends of Table V are shown in Table VI.

TABLE V

COMPOSITION AND PREPARATION OF SULFONATED POLYPENTENAMER POLYMER WITH ELASTOMERS AND PETROLEUM RESINS

| Blend # | 5-1 | 5-2 | 5-3 | 5-4 | 5-5 |
|---|---|---|---|---|---|
| Sulfonated Polypentenamer (~20meq; Zn Salt) | 25 | 25 | 25 | — | — |
| Polpentenamer (Base Polymer) | — | 25 | 25 | 25 | — |
| Polyisoprene | 50 | — | 25 | 50 | — |
| Kraton 1107 | — | — | — | — | 50 |
| Wingtak Plus | 50 | 25 | 25 | 50 | 50 |

Blend #5-5 is included here only for comparative purposes. It is a typically used adhesive formulation especially as hot melt pressure sensitive adhesive. Kraton 1107 is a block copolymer of the structure ABA in which A is a block of styrene (total ~15% by weight) whose number average molecular weight is in the range of 10,000 to 30,000. B is an elastic block of isoprene (~85%) having a number average molecular weight of about 100,000.

TABLE VI

PROPERTIES OF THE BLENDS OF SULFONATED POLYPENTENAMER WITH ELASTOMERS AND PETROLEUM RESINS

| Blend # | Green Strength | Tackiness | Peel Strength (lbs.-force) | Mode of Failure During Peel Testing |
|---|---|---|---|---|
| 5 - 1 | Medium | Very Tacky | 1.01 | A.F./N.T. |
| 5 - 2 | High | Slightly Tacky | 0.50 | A.F./N.T. |
| 5 - 3 | High | Slightly Tacky | 2.51 | C.F./H.T. |
| 5 - 4 | High | Slightly Tacky | 6.6 | C.F./H.T. |
| 5 - 5 | High | Tacky | 11.1 | C.F./S.T. |

A.F. - Adhesive Failure
C.F. - Cohesive Failure
N.T. - No Transfer
H.T. - Heavy Transfer
S.T. - Slight Transfer The peel strength values were obtained by a method similar to ASTM D-429 adhesion test. In brief, the samples were sandwiched between mylar sheets and pressed to a thickness of about 25 mils using a hot press. Rectangular strips of ½" width and 3" long were cut and 90° peel tests were performed on an Instron at room temperature. The resin free sections of the mylar film were clamped into air jaws to avoid any slippage during pulling. The samples were pulled at 5"/min. crosshead speed. The force and elongation of the samples were recorded on a strip recorder. The force necessary to separate the mylar sheets was taken as the peel strength of the blend. The initial peak values are reported in the fifth column of Table VI.

What is claimed is:

1. A hot melt adhesive composition which comprises:
(a) a neutralized sulfonated elastomeric polymer having the formula

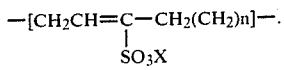

wherein n=2, 3, 4, 5 or 6, wherein X is a counterion, said neutralized sulfonated elastomeric polymer having about 5 to about 100 meq. of neutralized sulfonated groups per 100 grams of said neutralized sulfonated elastomeric polymer; and
(b) about 25 to about 200 parts by weight of a hydrocarbon tackifying resin based on a petroleum or coal tar distillate per 100 parts by weight of said neutralized sulfonated elastomeric polymer.

2. A hot melt adhesive composition according to claim 1, wherein said neutralized sulfonated elastomeric polymer is derived from a polypentenamer.

3. A hot melt adhesive composition according to claims 1 or 2, wherein said neutralized sulfonate groups are neutralized with said counterion being selected from the group consisting of ammonium, aluminum, antimony, iron, lead and Groups IA, IIA, IB and IIB of the Periodic Table of Elements.

4. A hot melt adhesive composition according to claims 1 or 2, wherein said neutralized sulfonate groups are neutralized with zinc ions.

5. A hot melt adhesive according to claim 1 further including about 3 to about 75 parts by weight of an ionic preferential plasticizer per 100 parts by weight of said neutralized sulfonated elastomeric polymer, wherein said preferential plasticizer is selected from the group consisting of carboxylic acids having about 8 to about 22 carbon atoms, metallic salts of said carboxylic acids, amides having an aliphatic groups of about 8 to about 22 carbon atoms, amines, ureas and thioureas and mixtures thereof.

6. A hot melt adhesive according to claim 5, wherein said preferential plasticizer is said metallic salt of said carboxylic acid.

7. A hot melt adhesive composition according to claim 6, wherein said metallic salt of said carboxylic acid is zinc stearate.

8. A hot melt adhesive composition according to claims 1 or 2, further including about 5 to about 800 parts by weight of a filler per 100 parts by weight of said neutralized sulfonated elastomeric polymer, said filler being selected from the group consisting of calcium carbonates, silicas, carbon blacks, clays, and talcs and mixtures thereof.

9. A hot melt adhesive composition according to claims 1 or 2, wherein said hydrocarbon resin has about 5 to about 6 carbon atoms and consists of aliphatic dienes, mono and diolefins and cyclic olefins.

10. A hot melt adhesive composition according to claim 1 further including from about 1 to about 100 parts by weight of an oil per 100 parts by weight of said neutralized sulfonated elastomeric polymer resin, said oil being an aromatic, naphthenic or paraffinic basestock.

11. A hot melt adhesive according to claim 1, further including an unsaturated hydrocarbon resin.

* * * * *